United States Patent
Smith et al.

(10) Patent No.: US 6,311,266 B1
(45) Date of Patent: Oct. 30, 2001

(54) INSTRUCTION LOOK-AHEAD SYSTEM AND HARDWARE

(75) Inventors: Burton J. Smith; Robert L. Alverson, both of Seattle, WA (US)

(73) Assignee: Cray Inc., Seattle, WA (US)

( * ) Notice: Subject to any disclaimer, the term of this patent is extended or adjusted under 35 U.S.C. 154(b) by 0 days.

(21) Appl. No.: 09/221,187

(22) Filed: Dec. 23, 1998

(51) Int. Cl.$^7$ ...................................................... G06F 9/38
(52) U.S. Cl. ........................ 712/216; 712/214; 712/215; 712/218; 712/228
(58) Field of Search ................... 712/215, 216, 712/218, 228

(56) References Cited

U.S. PATENT DOCUMENTS

| | | |
|---|---|---|
| 5,555,384 | 9/1996 | Roberts et al. . |
| 5,712,996 | 1/1998 | Schepers . |
| 5,933,627 * | 8/1999 | Parady .................................. 712/228 |
| 6,105,051 * | 8/2000 | Borkenhagen et al. ............. 709/103 |
| 6,216,220 * | 4/2001 | Hwang ................................. 712/219 |
| 6,223,208 * | 4/2001 | Kiefer et al. ......................... 709/108 |
| 6,233,599 * | 5/2001 | Nation et al. ........................ 709/102 |

OTHER PUBLICATIONS

Tullsen et al., "Simultaneous Multithreading: Maximizing On–Chip Parallelism," *Proceedings of the 22nd International Symposium on Computer Architecture*, pp. 392–403, IEEE, Jun. 22–24, 1995.*

Alverson et al., "Exploiting Heterogeneous Parallelism on a Multithreaded Multiprocessor," *Proceedings of the 1992 International Conference on Supercomputing*, ACM, pp. 188–197, Jul. 19–24, 1992.*

Anderson et al., "The Performance Implications of Thread Management Alternatives for Shared–Memory Multiprocessors," *IEEE Transactions on Computers*, pp. 1631–1644, vol. 38, iss. 12, Dec. 1989.*

*Superscalar Microprocessor Design*, Englewood Cliffs, NJ, Jan. 1, 1991, Chap. 6, "Register Dataflow," pp. 103–126.

Gail Alverson et al., "Tera Hardware–Software Corporation", in *Proceedings of Supercomputing*, Nov. 1997.

Gail Alverson et al., "Scheduling on the Tera MTA" in *Job Scheduling Strategies for Parallel Processing, 949:of Lecture Notes in Computer Science*, Springer–Verlag, 1995.

Robert Alverson et al., "The Tera Computer System", in *Proceedings of 1990 ACM International Conference on Supercomputing*, pp. 1–6, Jun. 1990.

D.H. Bailey et al., "The NAS Parallel Benchmarks—Summary and Preliminary Results", in *Proceeding of Supercomputing '91*, pp. 158–165, Nov. 1991.

David Callahan, Recognizing and Parallelizing Bounded Recurrences, in *Languages and Compilers for Parallel Computing, 589:of Lecture Notes in Computer Science*, pp. 169–185, Springer–Verlag, 1992.

(List continued on next page.)

Primary Examiner—William M. Treat
(74) Attorney, Agent, or Firm—Seed IP Law Group PLLC

(57) ABSTRACT

A method and system for executing instructions in a computer. Each instruction has a look-ahead code indicating the number of instructions after which may be executed before its own execution is completed. The look-ahead code increments a counter associated with the instruction one past the look-ahead location. The instruction then begins execution. The next instructions will also be cleared to begin execution if they are less than the look-ahead code away from the current instruction. A large number of instructions can thus begin execution and be executing at the same time, thus increasing the speed of the computer operation.

12 Claims, 2 Drawing Sheets

OTHER PUBLICATIONS

David Callahan et al., "Improving Register Allocation for Subscripted Variables", in *Proceedings of the ACM SIGPLAN '90 Conference on Programming Language Design and Implementation, SIGPLAN Notices*, 25(6):53–65, Jun. 1990.

David Callahan and Burton Smith, "A Future–based Parallel Language For a General–purpose Highly–parallel Computer", in *Languages and Compilers for Parallel Computing*, pp. 95–113, 1990.

Mark Linton, "The Evolution of Dbx", in *USENIX Summer Conference*, 1990.

Roy F. Touzeau, "A Fortran Compiler for the FPS–164 Scientific Computer", in *Proceedings of the ACM SIGPLAN '84 Symposiun on Compiler Construction, SIGPLAN Notices* 19(6):48–57, Jun. 1984.

* cited by examiner

INSTRUCTION LOOK-AHEAD SYSTEM AND HARDWARE

TECHNICAL FIELD

This invention relates to execution of instruction sets in a computer, and more particularly, to a method and apparatus for executing certain instruction sets while waiting to execute other instruction sets.

BACKGROUND OF THE INVENTION

Computers operate by executing instructions. The speed at which a computer can execute an instruction set determines how rapidly the computer can execute its operations through a sequence of steps. At present, computers advance by executing an instruction after which the subsequent instruction of the set of the operating code is executed. This has the disadvantage that if a particular instruction set requires significant time for execution, that other instruction sets cannot be executed at the same time.

SUMMARY OF THE INVENTION

According to principles of the present invention, a computer system is organized to permit execution of multiple instructions in a rapid sequence while ensuring that no instruction is executed until the proper time.

Each instruction is a part of a set of instructions. Each instruction within the set has associated with it a code which provides information regarding the relationship of its execution to the execution of other instructions in the set. The code includes a look-ahead value and a counter check. The look-ahead value provides the number of instructions which can be executed after the current instruction which do not rely on the completion of the current instruction in order to perform the operations specified therein. According to the invention, the current instruction begins execution and prior to its completion of execution, the next instruction may also begin execution. If the next instruction requires a value from the prior instruction, such as data from memory, then the next instruction cannot begin its action until the prior instruction has completed its execution. On the other hand, the next instruction may perform tasks which do not rely on the completion of the immediate prior instruction. It may, for example, perform an arithmetic operation on numbers already available and not rely on data provided by the previous instruction. Therefore, the subsequent instruction in the set can start execution and, in fact, can complete its execution prior to the previous instruction having completed its execution. The look-ahead code provides the number of instructions beyond the current instruction which can be executed before it has completed being executed.

A counter check code checks the value of a counter associated with the register in which the memory instruction is stored. If the counter is 0, then the instruction set has permission to execute and proceed. On the other hand, if the counter value is not 0, then the instruction does not have permission to execute and waits until its counter is 0 before it executes.

The look-ahead value of an instruction is used to increment the counter associated with the register at the location of the number of instruction sets ahead of the value plus 1. Thus, if the look-ahead value were 3, this means that the next three instructions can be executed before the current instruction has completed execution. However, the fourth instruction ahead of it cannot be assured of being cleared for execution until the current instruction is executed. Accordingly, the look-ahead value is used to increment a counter associated with the register four instructions ahead of the current instruction, the value 4 being n+1 where n is the look-ahead value. When the current instruction completes its execution, it decrements the same counter by 1. Therefore, when the time comes for the execution of the instruction stored in the register associated with that counter, the counter value will have been decremented by 1 and, if the count is 0, the instruction will be executed.

The present invention provides the advantage that instructions can be executed rapidly, with the start of execution of subsequent instructions beginning before a prior instruction has been completely executed. This significantly increases the speed of operation of the computer. A further advantage is provided that in the event subsequent instructions do not rely on the completion of a prior instruction that may execute completely while a prior instruction is still in operation. On the other hand, in the event a particular instruction relies on the completion of a prior instruction before execution, a method and system are provided to delay execution of the current instruction until the system is ensured that all related prior instructions have been completed. Therefore, the reliability of the system is enhanced while still significantly increasing the speed of operation.

DETAILED DESCRIPTION OF THE INVENTION

Figure 1:
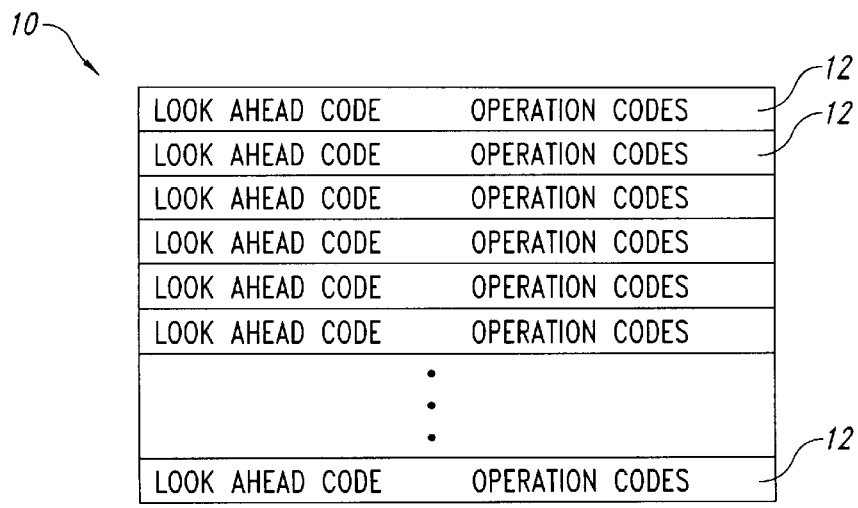
FIG. 1 is a graphical representation of a register storing a set of instructions according to principles of the present invention.

FIG. 1 shows the structure of a set of instructions 10. Each set of instruction 10 includes a group of individual instructions 12. Each instruction 12 includes at least two types of codes, a look-ahead code and various operation codes. Of course, the instruction may include a number of other codes which need not be discussed with regards to the present invention. The look-ahead code is normally at the front portion of the instruction. In one embodiment, it is the first code encountered when operation of the instruction begins. In other embodiments, it may be the second or third code. However, it is always positioned near the forward portion of the instruction 12.

The look-ahead code provides information regarding the relationship between the current instruction and subsequent instructions, as will now be explained.

Some instructions require a different amount of time to complete execution. Some instructions may be fairly rapid, for example, the performing of a simple arithmetic operation such as the sum of two numbers can be done very rapidly in some computer systems. In addition, the control of certain functions, such as setting the control code of performing the control operation, can also be done quite rapidly in some computer systems. On the other hand, memory operations are generally more time-consuming. The length required for execution of a memory operation may also depend on the type and location of the memory being accessed. Some instruction sets may require the retrieval of data from a memory register. If the memory register is the type having a very fast access time, then the data may be retrieved quite rapidly as compared to other memory operations. On the other hand, if the memory is of the type located in a different part of the computer, or having a different access speed, then the memory operation may take even longer than a standard memory operation. The memory operation may be of the type which includes writing data to a certain memory, which normally takes longer than reading data from a particular memory location, again depending on the type of memory involved and the interaction between the memory and the other parts of the system. However, as a general rule, most memory operations require more time than other types of operations, such as arithmetic or control operations. For example, a standard memory operation may require in the range of 100–120 clock cycles but some other operations, such as a move or an arithmetical operation can, in some instances, be completely executed in 10–20 clock cycles or less.

The look-ahead code in each instruction contains information relevant to the amount of time expected for the execution of the current instruction and also the relationship of its execution to the execution of other instructions. If the current instruction is executing tasks which must be completed before the next subsequent instruction can be executed, then it is important that the current instruction complete its operation before the related subsequent instructions are executed. On the other hand, if the current instruction is not providing any essential information for the next subsequent instruction, then it is permissible to begin execution of the next instruction before the current instruction has completed its own execution.

Example of instances in which the relationship of the execution of instructions and their execution will now be given. Assume that a first instruction is to perform the arithmetic operation of the sum of two numbers. The next instruction is to use that sum in order to perform a calculation or some other operation in the computer program. The next instruction therefore cannot perform its execution until the prior instruction has completed the arithmetic operation and provided the sum of the two numbers. Accordingly, the first instruction must complete its operation before the next subsequent instruction can be executed. Similarly, if the current instruction includes a memory read and retrieve of data or memory store in certain data location and the next subsequent instruction is relying on that data perform its operation, then the next subsequent instruction cannot begin execution until the present instruction has completed its operation.

On the other hand, if the current instruction is to perform an arithmetic sum of two numbers and the next subsequent instruction is to perform a memory read, then the second instruction can begin its execution and, in fact, could proceed to complete its execution prior to the previous instruction having completed its execution. Similarly, if the second or third following instruction sets include instructions such as control operations or retrieving additional data from memory which do not require the product from the first instruction or the data from memory of the second instruction, then these instructions could also begin execution prior to the first instruction having completed its own execution. Indeed, they could proceed to completion of their own execution while previous instructions are still performing their instructions.

According to principles of the present invention, after a current instruction set has begun its execution, a subsequent instruction set can also begin execution before the immediate previous instruction has completed its own execution. The subsequent instruction set may complete its own execution and the next instruction begin execution prior to the then current instruction set having completed its own execution.

The starting of execution of various instructions before the completion of a number of prior instruction can proceed for as many as desired, so long as the completion of the current instruction set is not a requirement to start execution of any subsequent instruction set. Therefore, following the start of execution of a first instruction set, subsequent instructions may also begin execution before the completion of the current instruction. The look-ahead code associated with each instruction provides an indication of how many subsequent instructions can begin their execution prior to completion of the current instruction, as will now be explained.

Figure 2:
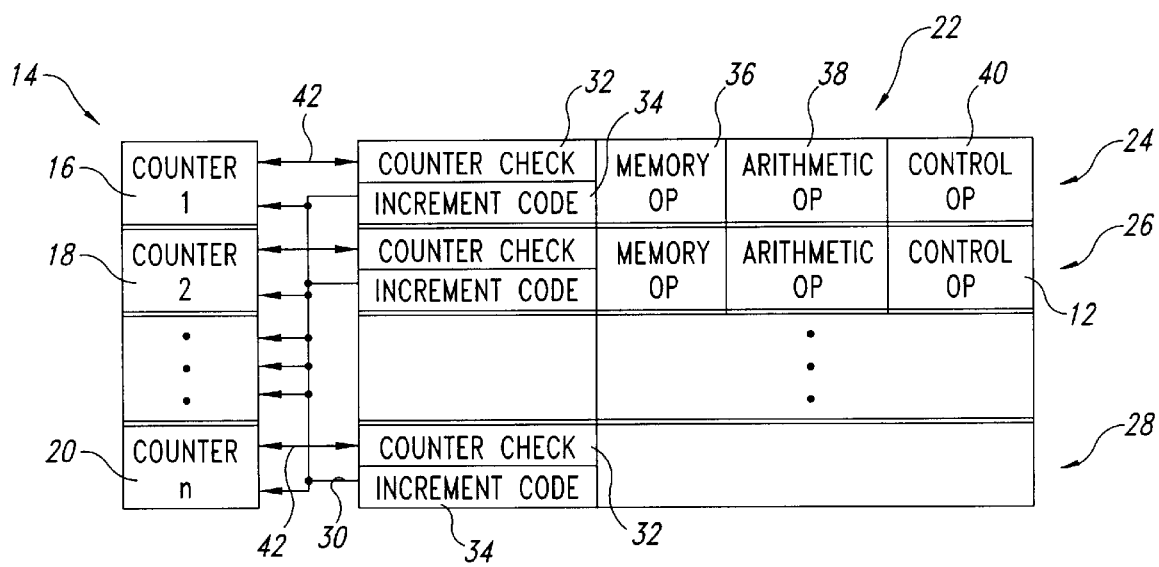
FIG. 2 is a block diagram schematic of a counter and a register according to principles of the present invention.

FIG. 2 is a block diagram of a hardware implementation of the concept of the present invention as explained with respect to FIG. 1. FIG. 1 illustrates a counter block 14 which is composed of a plurality of counters 16, 18, and the like, up until counter n20.

Of course, there are other possible hardware implementations of the present invention. This example is given as one suitable method for carrying out the present invention and other hardware implementations may be used which are equivalent.

The circuit also includes a memory register 22 which includes a plurality of individual registers 24 and 26 to n register 28. Each register in the memory register 22 is associated with a particular counter in the counter circuit 14. In the present example, the first counter 16 is associated with the first register 24, the second counter 18 is associated with the second register 26, and so on with n counter 20 being associated with n register 28. In one present embodiment, there are eight registers and eight counters though, of course, there could be any number higher or lower such as 4, 16, 32, or the like. The register 24 is also connected to each of the counters 16, 18, etc., via a counter bus 30. In addition, each of the registers 24, 26, etc., is connected to the counter bus 30 which provides access of each register to each of the counters 16, 18, etc., in the counter circuit 14.

A set of instructions are stored in the memory 22, with one instruction in each respective register 24, 26, etc. As part of each instruction, also stored in the same register is a counter check code 32 and an increment code 34. The counter check code 32 checks the value in the counter associated with that particular register. In the present case, register 1 is associated with counter 1. Therefore, the value stored in counter 1 is checked. If the value is 0, then the instruction is enabled for execution.

The communication link for the counter check 32 can be on counter bus 30 so that only a single bus is provided between the register 22 and the counter 14. Alternatively, there may be an associated link between the counter 14 and the counter check 32, such as the direct link 42 or a counter check bus 42 to provide fast query and response between a particular register and its associated counter. Either of two embodiments, or further alternative embodiment which permits communication to and from the register 24 to the counter 14 and individual counters within the counter are acceptable, many suitable such connections being known in the art.

The look-ahead code also includes an increment code 34 stored in register 24. The increment code 34 contains a numerical value corresponding to the number of subsequent instructions which can be executed before the execution of the current instruction is completed. This value is used as the address to a particular counter within the counter circuit 14. The increment code 34 provides a pointer to either increment or decrement the proper counter in register 14. The number of counters ahead of the current register, plus 1, is incremented by 1. In the event the increment code is 0, then no counter is incremented in one embodiment. For example, the instruction may be of the type that executes very fast and it will be executed and completed before the system would have time to start on the next instruction. Some time is thus saved by not performing the increment and decrement. In an alternative embodiment, when the increment code is 0, then the next subsequent counter is incremented.

Following the execution of the look-ahead code, the remainder of the instruction is executed. This instruction may include such operations as a memory operation 36, an arithmetic operation 38, or a control operation 40. Each instruction may have all three of these types of operations, or only two or only one of these types of operations. They may also have other types of operations since there are many possible operations and these three are only provided as examples. Thus, any acceptable type of operation which is included in any instruction set for the computer system is also stored in this register 24. In addition, even though instruction sets may include all operations, the actual operation may be of the type termed a "no operation," namely, that the operation to be performed is none for that particular instruction set for a given type of operation.

The value of the code stored as the increment code represents the number of subsequent instructions whose execution can begin before the current instruction has completed its own execution. For example, in the event the next three subsequent instructions can begin execution prior to the current instruction having completed its execution, the value stored in the increment code will be 3. The fourth instruction following the then current instruction may, or on the other hand, may not require completion of the instruction stored in register 24. However, if it is not assured that the instruction can begin execution prior to completion of the execution of such a previous instruction, then the code is selected to prevent execution of this instruction. Following the checking of the counter and the incrementing of the appropriate next counter, execution of the current instruction begins. Subsequently, the next instruction stored in register 26 is checked for execution. This check for execution occurs before the prior instruction has completed its execution. The instruction stored in register 26 checks its associated counter 2 to confirm that the count value is 0. If the count value is 0, then it can begin execution. If the count value is non-0, then it does not begin execution. The value in its own increment code is also checked to determine the number of following instructions which may be executed prior to its completing its own execution. Assuming, for purposes of this example that the number stored in this increment code value is 2, then the counter which is located two positions ahead of the current register, will be incremented 1. In the example provided, this will increment the same register as was incremented in the previous example so the counter at the fourth location now has a 2 stored therein. The instruction stored in register 26 thereafter begins execution. The instruction stored in the next register and associated with counter 3 then begins execution. It also performs a counter check and an increment code as previously described with respect to registers 24 and 26. In the event its counter code is 0, it begins execution. It can thus begin execution even though the two previous instructions are still under execution. Subsequently, the instruction set stored in the next register begins execution. As a first step of execution, it checks the value in its counter. In this example, the value in the counter will be 2. Therefore, since this value is not 0, it will not begin execution but will wait until its counter value reaches 0. When the instruction stored in register 24 completes its execution, it will decrement by 1 the counter whose location is indicated by its increment code 34. Therefore, the counter at location 4 will be decremented 1. A decrement can be thought of as a negative decrement, thus increment code 34 provides the value and instructions to perform either an increment or a decrement as needed. Further, when the instructions stored in register 26 completes its execution, it will also decrement the counter it causes to be incremented using the increment code value from register 34 as the pointer to the proper counter. If the instruction in register 26 is more quickly executed than that stored in register 24, it may complete its execution even before the instruction stored in register 24 has completed its execution. In the example provided, the counter will now be at 0 and the execution of the instruction stored in this register can proceed.

In one embodiment, the increment code can be any value from 0 to 7 and the counters are 3-bit numbers which can count eight numbers, from 0 to 7. Accordingly, for each register it can look ahead up to seven instructions and permit execution of each of the respective instructions to begin prior to its execution being completed.

The register 24 has rollover capability for referencing to additional counters. For example, if the n register 28 has a value stored in the increment code, then it rolls over to the next counter starting at counter 16 and goes down to the proper counter according to its value. Thus, if the code stored in register 28 is 6, it will count forward six counters plus 1, to counter number 7 and increment that counter.

When an instruction has been completed in a particular register, then a new instruction may be stored in the same register and execution of the program continues. Thus, the instruction set which is stored in each particular register will be changed to include a new instruction set when it is no longer necessary to maintain that instruction set in the memory 22. Each of the new instructions will have as its part of their instruction set the increment code indicating which instructions ahead of it can being their execution before its own execution is completed. Therefore, each instruction carries with it the information necessary for continued operation according to principles of the present invention.

Figure 3:
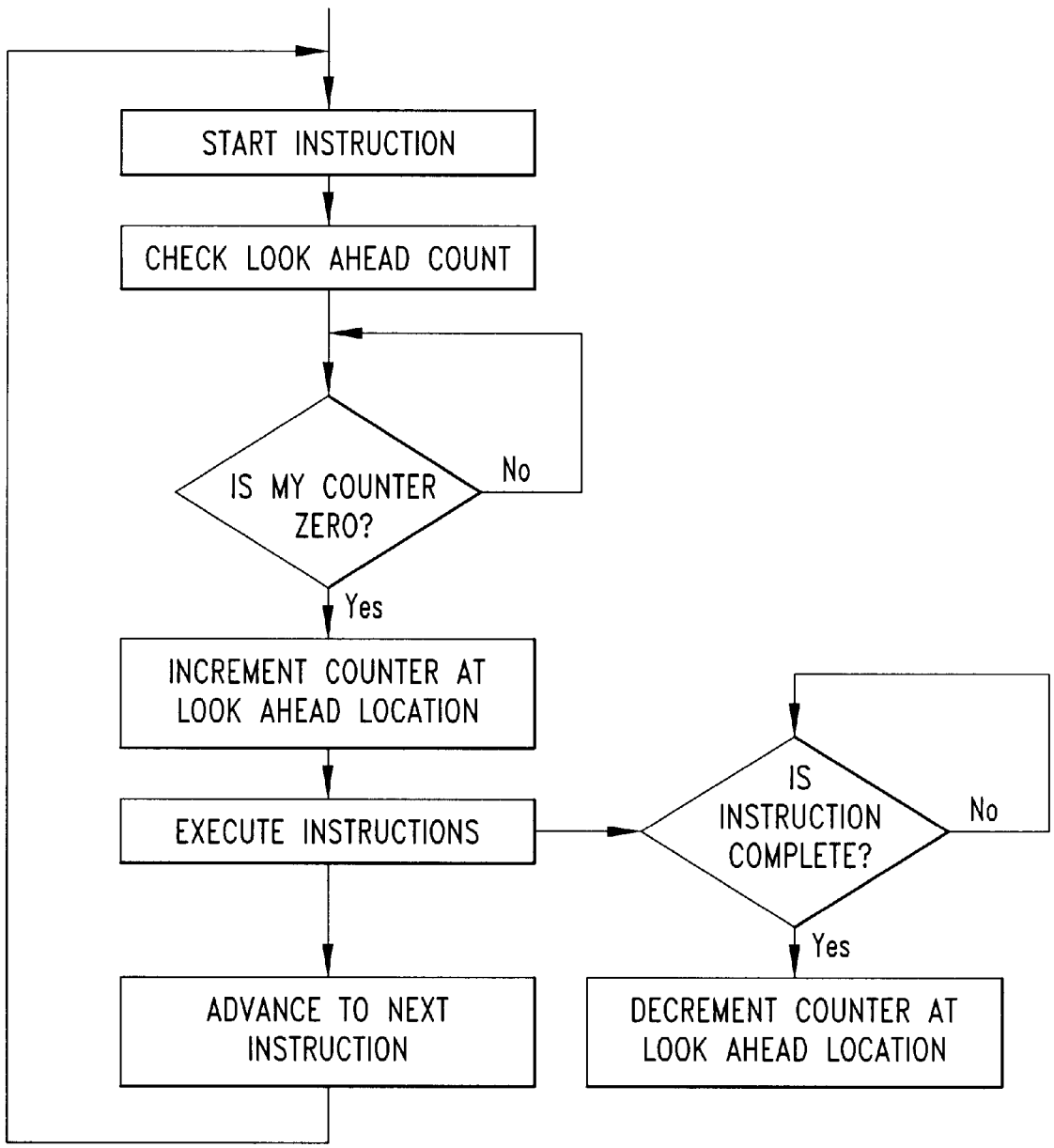
FIG. 3 is a flowchart of operation of the present invention.

FIG. 3 provides a brief summary of a flowchart according to one embodiment of the present invention. In the beginning step, execution of the instruction is started. The look-ahead count is checked and the counter at the look-ahead location is incremented. The instruction then checks its own counter to see if its current counter has a 0 value. If the answer is NO, then it does not perform any further execution but waits to proceed until the counter is 0. It continues to query whether the counter has reached 0 and begins execution as soon as the counter reaches 0. Various embodiments for the sequence of the first few steps have been disclosed herein. For example, whether the counter check occurs first followed by the increment as described with respect to FIG. 2 or, on the other hand, if the increment of the look-ahead counter occurs first followed by checking the value of the associated counter both fall within the scope of the present invention.

After execution of the instruction has begun, the program proceeds to start execution of the next instruction. This returns to the start of the flowchart as shown in FIG. 3. This can continue for many instructions, so that 7 or 16 or more instructions have begun execution before a current instruction is finished. The value of the look-ahead code will specify the number which can be started. Once the current instruction has completed its execution, it decrements the counter at its look-ahead location.

In preferred operation, the sequence of instructions and the speed of operation is selected such that each time an instruction is ready for operation, its own counter will either be 0, or will have been decremented sufficiently that it will soon reach 0 so that operation can proceed quickly and smoothly. The present invention provides a significant advantage that execution of a number of instructions can begin before a prior instruction has completed its execution. Many instructions can be executed simultaneously. Once the instruction has completed its execution, it decrements the counter at the correct location and, if all instructions which have caused an increment of that counter have also been completed, then the counter will be decremented to 0 and that instruction can be executed when the computer reaches it as the next instruction set to start execution. As a further advantage, the start of the execution of each of the instructions can occur very rapidly, so that many instructions that have started to execute may do so immediately. As soon as an instruction is cleared for execution, it will begin to be executed, thus significantly speeding up the operation of the computer and the completion of the full instruction set.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A method of executing computer code having a set of instructions comprising:

reading the value of a look ahead code associated with the current instruction;

incrementing a counter at the location specified by the look ahead code;

reading the value in a counter associated with the current instruction;

executing current instruction if the counter associated with it has a value of zero;

waiting to execute the current instruction if the counter associated with it has a non-zero and executing the code when the counter value reaches zero;

decrementing the counter at the location specified by the look ahead code after the instruction has been executed.

2. The method according to claim 1 wherein the step of incrementing the counter includes the step of:

after reading the value of the look ahead code, addressing that counter at the location n+1 counters ahead of the current counter where n is the value of the look ahead code.

3. The method according to claim 1 further including the step of:

incrementing no counter when the value of the look ahead code is zero.

4. A method of ensuring proper operation of a set of instructions for a computer program comprising:

storing each instruction in an instruction set memory having a register for each instruction;

reading the value stored in a counter associated with each register;

executing the instruction if the value of the counter is zero;

not executing the instruction if the value in the counter is a number other than zero.

5. The method according to claim 4 further including:

storing a look ahead code as a part of each instruction;

reading the look ahead code for that instruction prior to executing that instruction;

incrementing a counter associated with a different register than the register holding the current instruction when the look ahead code has a value above zero;

executing the current instruction;

decrementing the counter associate with the different register than the register holding the current instruction after the current instruction is executed.

6. An apparatus for ensuring proper operation of a set of instructions, comprising:

an instruction set memory composed of a plurality of registers storing respective instructions therein;

a counter associated with each register; and a connection between each register and its associated counter for reading the value of its counter.

7. The apparatus according to claim 6 further including:

a connection between each register storing an instruction in the memory and each counter associated with each other register in the memory permitting each counter to be incremented or decremented from each other register in the memory.

8. The apparatus according to claim 6 wherein each counter is a 3 bit counter and there are 8 registers in the memory and 8 counters associated with the memory.

9. The apparatus according to claim 6 wherein each instruction is includes a look ahead code, and an instruction set.

10. The apparatus according to claim 9 wherein each look ahead code includes a counter check code and a counter increment code.

11. The apparatus according to claim 9 wherein each instruction set includes a memory operation, an arithmetic operation and a control operation.

12. The apparatus according to claim 6 further including:

an instruction set load circuit for loading a new set of instructions into the memory register after all instructions in the current set have been executed.

* * * * *